United States Patent
Boden et al.

(10) Patent No.: US 9,938,439 B2
(45) Date of Patent: Apr. 10, 2018

(54) PRODUCTION TOOL TO MAKE ABRASIVE PARTICLES WITH GROOVES

(71) Applicant: 3M INNOVATIVE PROPERTIES COMPANY, St. Paul, MN (US)

(72) Inventors: John T. Boden, White Bear Lake, MN (US); Dwight D. Erickson, Woodbury, MN (US); Scott R. Culler, Burnsville, MN (US); Negus B. Adefris, Woodbury, MN (US); John D. Haas, Roseville, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 129 days.

(21) Appl. No.: 14/270,741

(22) Filed: May 6, 2014

(65) Prior Publication Data

US 2014/0239148 A1 Aug. 28, 2014

Related U.S. Application Data

(62) Division of application No. 12/627,567, filed on Nov. 30, 2009, now Pat. No. 8,764,865.

(60) Provisional application No. 61/138,268, filed on Dec. 17, 2008.

(51) Int. Cl.
| | |
|---|---|
| *B24D 11/00* | (2006.01) |
| *C09K 3/14* | (2006.01) |
| *B24D 3/00* | (2006.01) |
| *B24D 18/00* | (2006.01) |

(52) U.S. Cl.
CPC .............. *C09K 3/1409* (2013.01); *B24D 3/00* (2013.01); *B24D 11/00* (2013.01); *B24D 18/0009* (2013.01); *Y10T 428/24364* (2015.01); *Y10T 428/257* (2015.01); *Y10T 428/2982* (2015.01)

(58) Field of Classification Search
CPC ...... B24D 11/00; B24D 18/0009; B24D 3/00; C09K 3/1409; Y10T 428/24364; Y10T 428/257; Y10T 428/2982
See application file for complete search history.

(56) References Cited

U.S. PATENT DOCUMENTS

| | | |
|---|---|---|
| 1,910,444 A | 5/1933 | Nicholson |
| 3,041,156 A | 6/1962 | Rowe |
| 3,079,243 A | 2/1963 | Ueltz |
| 3,387,957 A | 6/1968 | Howard |

(Continued)

FOREIGN PATENT DOCUMENTS

| | | |
|---|---|---|
| CA | 743 715 | 10/1966 |
| EP | 0 293 163 | 11/1988 |

(Continued)

OTHER PUBLICATIONS www.abrasivematerials.saint-gobain.com News—Shaped Abrasive Particles Article, Dated Apr. 25, 2011 and retrieved on May 23, 2011.

(Continued)

*Primary Examiner* — Shuangyi Abu Ali

(57) ABSTRACT

Abrasive particles comprising shaped abrasive particles each having a sidewall, each of the shaped abrasive particles comprising alpha alumina and having a first face and a second face separated by a sidewall and having a maximum thickness, T; and the shaped abrasive particles further comprising a plurality of grooves on the second face.

9 Claims, 11 Drawing Sheets

(56) References Cited

U.S. PATENT DOCUMENTS

| | | | |
|---|---|---|---|
| 3,481,723 A | 12/1969 | Kistler | |
| 3,536,005 A | 10/1970 | Derrickson | |
| 3,874,856 A | 4/1975 | Leeds | |
| 3,909,991 A | 10/1975 | Coes, Jr. | |
| 4,150,078 A | 4/1979 | Miller | |
| 4,314,827 A | 2/1982 | Leitheiser | |
| 4,341,663 A | 7/1982 | Derleth | |
| 4,393,021 A | 7/1983 | Eisenberg | |
| 4,548,617 A | 10/1985 | Miyatani | |
| 4,744,802 A | 5/1988 | Schwabel | |
| 4,799,939 A | 1/1989 | Bloecher | |
| 4,848,041 A | 7/1989 | Kruschke | |
| 4,954,462 A | 9/1990 | Wood | |
| 4,963,012 A | 10/1990 | Tracy | |
| 4,997,461 A | 3/1991 | Markhoff-Matheny | |
| 5,009,675 A | 4/1991 | Kunz | |
| 5,009,676 A | 4/1991 | Rue | |
| 5,011,508 A | 4/1991 | Wald | |
| 5,035,723 A | 7/1991 | Kalinowski | |
| 5,042,991 A | 8/1991 | Kunz | |
| 5,049,166 A | 9/1991 | Nagaoka | |
| 5,049,645 A | 9/1991 | Nagaoka | |
| 5,078,753 A | 1/1992 | Broberg | |
| 5,085,671 A | 2/1992 | Martin | |
| 5,090,968 A | 2/1992 | Pellow | |
| 5,120,327 A | 6/1992 | Dennis | |
| 5,152,917 A | 10/1992 | Pieper | |
| 5,185,299 A | 2/1993 | Wood | |
| 5,201,916 A * | 4/1993 | Berg | B24D 3/14 264/6 |
| 5,213,591 A | 5/1993 | Celikkaya | |
| 5,282,875 A | 2/1994 | Wood | |
| 5,304,331 A | 4/1994 | Leonard | |
| 5,312,789 A | 5/1994 | Wood | |
| 5,312,791 A | 5/1994 | Coblenz | |
| 5,366,523 A | 11/1994 | Rowenhorst | |
| 5,409,645 A | 4/1995 | Torre, Jr. | |
| 5,431,967 A | 7/1995 | Manthiram | |
| 5,435,816 A | 7/1995 | Spurgeon | |
| 5,441,549 A | 8/1995 | Helmin | |
| 5,443,603 A | 8/1995 | Kirkendall | |
| 5,454,844 A | 10/1995 | Hibbard | |
| 5,496,386 A | 3/1996 | Broberg | |
| 5,516,348 A | 5/1996 | Conwell | |
| 5,551,963 A | 9/1996 | Larmie | |
| 5,576,409 A | 11/1996 | Mackey | |
| 5,584,896 A | 12/1996 | Broberg | |
| 5,593,467 A | 1/1997 | Monroe | |
| RE35,570 E | 7/1997 | Rowenhorst | |
| 5,645,619 A | 7/1997 | Erickson | |
| 5,667,542 A | 9/1997 | Law | |
| 5,672,097 A | 9/1997 | Hoopman | |
| 5,725,162 A | 3/1998 | Garg | |
| 5,776,214 A | 7/1998 | Wood | |
| 5,779,743 A | 7/1998 | Wood | |
| 5,893,935 A | 4/1999 | Wood | |
| 5,902,647 A | 5/1999 | Venkataramani | |
| 5,908,477 A | 6/1999 | Harmer | |
| 5,908,478 A | 6/1999 | Wood | |
| 5,946,991 A | 9/1999 | Hoopman | |
| 5,975,987 A | 11/1999 | Hoopman | |
| 5,984,988 A | 11/1999 | Berg | |
| 6,019,805 A | 2/2000 | Herron | |
| 6,053,956 A | 4/2000 | Wood | |
| 6,054,093 A | 4/2000 | Torre, Jr. | |
| 6,080,215 A | 6/2000 | Stubbs | |
| 6,080,216 A | 6/2000 | Erickson | |
| 6,129,540 A | 10/2000 | Hoopman | |
| 6,206,942 B1 | 3/2001 | Wood | |
| 6,228,134 B1 | 5/2001 | Erickson | |
| 6,261,682 B1 | 7/2001 | Law | |
| 6,264,710 B1 | 7/2001 | Erickson | |
| 6,277,160 B1 | 8/2001 | Stubbs | |
| 6,277,161 B1 | 8/2001 | Castro | |
| 6,287,353 B1 | 9/2001 | Celikkaya | |
| 6,312,324 B1 | 11/2001 | Mitsui | |
| 6,319,108 B1 | 11/2001 | Adefris | |
| 6,475,253 B2 | 11/2002 | Culler | |
| 6,524,681 B1 | 2/2003 | Seitz | |
| 6,696,258 B1 | 2/2004 | Wei | |
| 6,843,815 B1 | 1/2005 | Thurber | |
| 6,881,483 B2 | 4/2005 | McArdle | |
| 6,974,930 B2 | 12/2005 | Jense | |
| 7,297,402 B2 | 11/2007 | Evans | |
| 7,373,887 B2 | 5/2008 | Jackson | |
| 7,524,345 B2 | 4/2009 | Nevoret | |
| 7,867,302 B2 | 1/2011 | Nevoret | |
| 7,875,091 B2 | 1/2011 | Nevoret | |
| 8,333,360 B2 * | 12/2012 | Rule | B29C 33/40 249/187.1 |
| 2001/0027623 A1 | 10/2001 | Rosenflanz | |
| 2002/0026752 A1 | 3/2002 | Culler | |
| 2002/0151265 A1 | 10/2002 | Adefris | |
| 2003/0085204 A1 | 5/2003 | Lagos | |
| 2003/0110707 A1 | 6/2003 | Rosenflanz | |
| 2003/0126800 A1 | 7/2003 | Seth | |
| 2004/0003895 A1 | 1/2004 | Amano | |
| 2004/0148967 A1 | 8/2004 | Celikkaya | |
| 2004/0235406 A1 | 11/2004 | Duescher | |
| 2004/0244675 A1 | 12/2004 | Kishimoto | |
| 2005/0020190 A1 | 1/2005 | Schutz | |
| 2005/0060941 A1 | 3/2005 | Provow | |
| 2005/0060947 A1 | 3/2005 | McArdle | |
| 2005/0064805 A1 | 3/2005 | Culler | |
| 2005/0132655 A1 | 6/2005 | Anderson | |
| 2005/0232853 A1 | 10/2005 | Evans | |
| 2005/0284029 A1 | 12/2005 | Bourlier | |
| 2006/0111031 A1 | 5/2006 | Morita | |
| 2006/0185256 A1 | 8/2006 | Nevoret | |
| 2006/0214326 A1 * | 9/2006 | Kim | B29C 33/3878 264/225 |
| 2007/0020457 A1 | 1/2007 | Adefris | |
| 2007/0072527 A1 | 3/2007 | Palmgren | |
| 2008/0172951 A1 | 7/2008 | Starling | |
| 2009/0016916 A1 | 1/2009 | Rosenzweig | |
| 2009/0165394 A1 | 7/2009 | Culler | |
| 2010/0003904 A1 | 1/2010 | Duescher | |
| 2010/0151195 A1 | 6/2010 | Culler | |
| 2010/0151196 A1 | 6/2010 | Adefris | |
| 2010/0151201 A1 | 6/2010 | Erickson | |
| 2010/0319269 A1 | 12/2010 | Erickson | |

FOREIGN PATENT DOCUMENTS

| | | | |
|---|---|---|---|
| EP | 0 662 110 | 7/1995 | |
| GB | 986 847 | 3/1965 | |
| GB | 986847 | * 3/1965 | B24B 31/14 |
| GB | 0 656 319 | 6/1995 | |
| JP | 60-006356 | 1/1985 | |
| JP | 2002-038131 | 2/2002 | |
| JP | 2003-049158 | 2/2003 | |
| JP | 2004-510873 | 4/2004 | |
| JP | 2006-192540 | 7/2006 | |
| WO | WO95/018192 | 7/1995 | |
| WO | WO99/038817 | 8/1999 | |
| WO | WO01/014494 | 3/2001 | |
| WO | WO09/085841 | 7/2009 | |
| WO | WO11/087649 | 7/2011 | |

OTHER PUBLICATIONS

"Investigation of Shaped Abrasive Particles vol. 1: Review of U.S. Pat. No. 6,054,093 Apr. 25, 2000" © Apr. 2011.

"Korean Application Serial No. 10-2011-7016324, Office Action dated Feb. 4, 2016".

* cited by examiner

○ Draft 90°
♦ Draft 98°
△ Draft 120°
□ Draft 135°

PRODUCTION TOOL TO MAKE ABRASIVE PARTICLES WITH GROOVES

CROSS REFERENCE TO RELATED APPLICATIONS

This application is a divisional application of pending prior application Ser. No. 12/627,567, now allowed, filed Nov. 30, 2009, which claims the benefit of Provisional Application No. 61/138,268, filed Dec. 17, 2008, he disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst; and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. The inventors have discovered that by making the shaped abrasive particle with a plurality of grooves on one of the shaped abrasive particle's faces, the precursor shaped abrasive particles release much easier from a production tooling having a plurality of mold cavities used to mold the shaped abrasive particles. Surprisingly, even though the total surface area of the mold cavity is increased by a plurality of ridges which form the plurality of grooves, the precursor shaped abrasive particles with a plurality of grooves are much easier to remove from the mold cavities.

The inventors have also discovered that the grooves on the shaped abrasive particles affect the grinding performance of the shaped abrasive particles when compared to identical shaped abrasive particles without the grooves. In particular, the initial cut rate is reduced and the cut rate tends to increase over time as the shaped abrasive particles begin to wear down. Typically, cut rate of an abrasive particle tends to decrease over the life of the abrasive particle. A similar result occurs with shaped abrasive particles which do not contain grooves. Thus, the inventors have found that they can manipulate the cut rate curve for abrasive articles made from the shaped abrasive particles by using blends of the shaped abrasive particles without grooves and with grooves to make abrasive articles having an extremely uniform cut rate over the working life of the abrasive article.

Hence in one embodiment, the invention resides in abrasive particles comprising shaped abrasive particles each having a sidewall, each of the shaped abrasive particles comprising alpha alumina and having a first face and a second face separated by a sidewall and having a maximum thickness, T; and the shaped abrasive particles further comprising a plurality of grooves on the second face.

In another embodiment, the invention resides in a production tooling for making shaped abrasive particles comprising a plurality of mold cavities, the plurality of mold cavities comprising a mold bottom surface, a mold sidewall, and a height, Hc; the mold bottom surface and the mold sidewall comprising a polymeric material; and wherein the bottom surface comprises a plurality of ridges.

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

Figure 1:
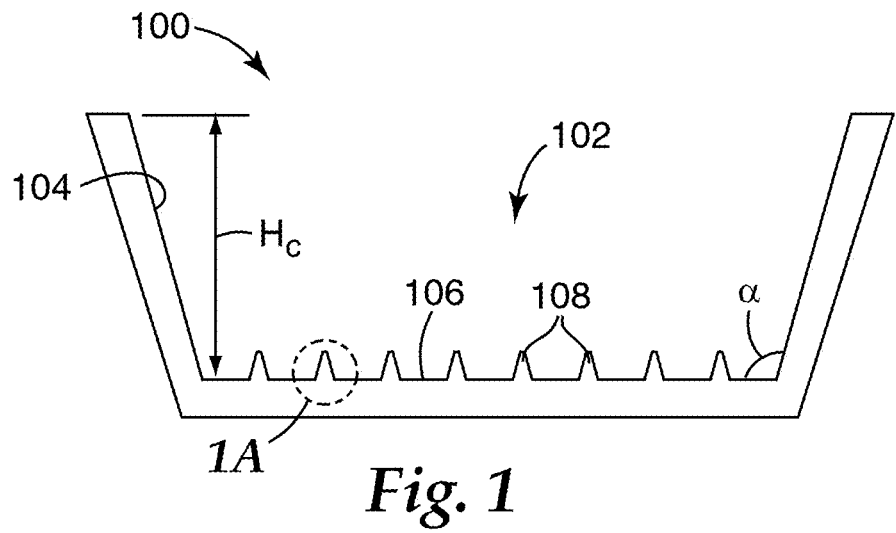
FIG. 1 illustrates a cross sectional view of a mold cavity having plurality of ridges in the bottom surface.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Shaped Abrasive Particles with Grooves

Referring to FIG. 1, a portion of a production tool 100 having a plurality of mold cavities 102 is shown. For clarity, a single mold cavity 102 is illustrated. The mold cavity 102 comprises a mold sidewall 104 and a mold bottom surface 106, and in one embodiment the mold bottom surface and the mold sidewall comprised a polymeric material. The geometric shape of the mold sidewall 104 forming a perimeter of the mold bottom surface can vary and in one embodiment the geometric shape was selected to be an equilateral triangle when viewed from the top of each mold cavity in the production tool such that the mold cavity had three opposing mold sidewalls. As discussed later herein, other geometric shapes for the mold cavity can be used. The mold sidewall 104 intersects with the mold bottom surface 106 at a predetermined angle $\alpha$. As discussed later herein, the grinding of performance of the shaped abrasive particles 20 can be improved by selecting the angle $\alpha$ to be between about 95 degrees to about 130 degrees. However, the predetermined angle $\alpha$ can be 90 degrees or even slightly less than 90 degrees since the precursor shaped abrasive particle formed in the mold cavity 102 can shrink during drying and therefore still be removed from the mold cavity instead of being trapped.

The mold bottom surface 106 comprises a plurality of ridges 108 rising from the mold bottom surface having a predetermined height Hr. In one embodiment of the invention, the height of the plurality of ridges, Hr, is small as compared to the total height of the mold cavity Hc. As mentioned, the plurality of ridges 108 have an unexpected benefit of making the precursor shaped abrasive particles much easier to remove from the mold cavities 102 of the production tooling 100 after the precursor shaped abrasive particles are dried. This result occurs even though the total surface area of the mold cavity is increased by the presence of the plurality of ridges, which one would expect would make it harder to remove the precursor shaped abrasive particles. The ability to easily release the precursor shaped abrasive particles from the mold cavities 102 is an important attribute for making shaped abrasive particles on a production line that operates continuously. This benefit is especially important as the speed of the production line is increased. Retained precursor shaped abrasive particles in the production tool "clog up" the production tool, not only reducing throughput, but also creating issues when attempting to vacuum slot coat the abrasive dispersion into the production tooling prior to drying the abrasive dispersion in a continuous oven.

It is believed that for the improved release properties to be achieved, the height of the plurality of ridges, Hr, should be smaller when compared to the total height of the mold cavity Hc. As the height, Hr, approaches the height, Hc, essentially the mold cavity 102 becomes subdivided into several smaller mold cavities and the benefit of improved release from the mold cavities can be lost. In various embodiment of the invention, the height, Hr, of the plurality of ridges 108 can be between about 1 micrometer to about 400 micrometers. Furthermore, a percentage ratio of the ridge height to the cavity height, Hr/Hc (expressed as a percent), can be between 0.1% to about 30%, or between 0.1% to about 20%, or between 0.1% to about 10%, or between about 0.5% to about 5%.

Figure 1A:
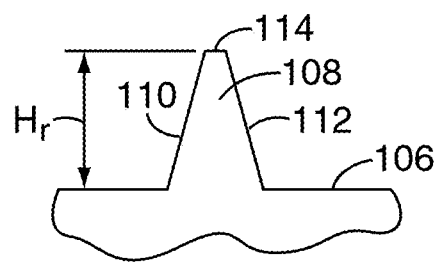
FIGS. 1A and 1B illustrate various cross sectional embodiments of the ridges in FIG. 1.

Additionally, for improved mold release properties, it is believed that the cross sectional geometry of the plurality of ridges 108 can be important. Referring to FIG. 1A, in one embodiment each ridge 108 comprises a first side 110, a second side 112, and a top 114. The first side 110 and the second side 112 each rise from the mold bottom surface 106 at an obtuse angle such that the ridge's cross sectional geometry tapers towards the top 114 forming a truncated triangle. In this respect, the ridge's cross sectional geometry also resembles a gear tooth or a wedge.

Figure 1B:
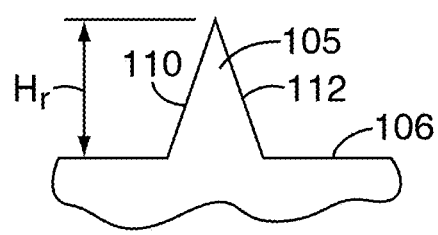

Referring to FIG. 1B, in another embodiment each ridge 108 comprises a first side 110, and a second side 112. The first side 110 and the second side 112 each rise from the mold bottom surface 106 at an obtuse angle such that the ridge's cross sectional geometry tapers towards the tip forming a triangle. In this respect, the ridge's cross sectional geometry also resembles a gear tooth or a wedge. In one embodiment, each ridge had a height, Hr, of 0.0127 mm and the included angle between the first side 110 and the second side 112 at the triangle's tip was 45 degrees. The mold cavity had a height, Hc, of 0.7112 mm and the percentage ratio of the ridge height to the cavity height, Hr/Hc was 1.79%.

It is believed that by having the ridge's cross section form a truncated triangle or triangle, each ridge acts as a wedge during drying that tends to lift the precursor shaped abrasive particle slightly off of the mold bottom surface 106 as the precursor shaped abrasive particle is dried. In some embodiments, the precursor shaped abrasive particle is thought to shrink slightly during drying, thereby, the "wedges" loosen the precursor shaped abrasive particle from the mold bottom surface making it easier to remove the precursor shaped abrasive particle from the mold cavity. In other embodiments, the ridge's cross sectional geometry can be square, rectangular, hemispherical, convex, parabolic, or other geometric shape.

Since one function of the plurality of ridges 108 is to provide an improved mold release, the spacing and uniformity of the plurality of ridges can be important. In particular, the mold bottom surface 106 of the mold cavity should be uniformly provided with ridges to ensure that portions of the precursor shaped abrasive particle are not "stuck" to the bottom surface. In one embodiment, the plurality of ridges 108 were continuous lines such that the plurality of ridges extended completely across the mold bottom surface 106 from one mold sidewall to the opposing mold sidewall of the triangular mold cavity. The plurality of ridges had a triangular cross section as described for FIG. 1B and comprised parallel lines that were spaced approximately every 0.277 mm.

In various embodiments of the invention, a percent spacing between each ridge can be between about 1% to about 50%, 1% to 40%, 1% to 30%, 1% to 20%, or 5% to 20% of a face dimension such as the length of one of the edges of the shaped abrasive particle. In one embodiment, an equilateral triangle having a side length at the mold bottom surface 106 of 2.54 millimeters and having 8 ridges per mold cavity at a spacing of 277 micrometers had a percent spacing between each ridge of 10.9%. In other embodiments of the invention the number of ridges in the mold bottom surface can be between 1 and about 100, about 2 to about 50, or about 4 to about 25.

The plurality of ridges can be placed onto the mold bottom surface in arcuate lines, straight lines, concentric geometric patterns such as nesting triangles, or cross-hatched lines having regular or irregular spacing. The plurality of ridges can be parallel to each other or intersecting. Combinations of various patterns can be used.

In other embodiments of the invention, the plurality of ridges can be in the form of discrete line segments that are placed at intervals along the bottom surface such that the plurality of ridges do not extend continuously between the opposing mold sidewalls. Alternatively, the line segmented plurality of ridges can be shortened considerably such that the bottom surface comprises a plurality of truncated pyramids evenly spaced into a grid pattern such that the bottom surface resembles a waffle iron griddle. Other discrete geometric ridge shapes can be placed onto the bottom surface to provide the surface with a dimpled pattern to improve its release characteristics.

Figure 2:
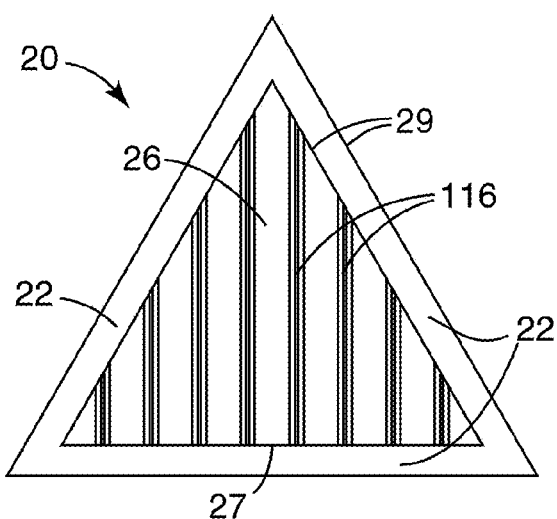
FIG. 2 illustrates a top view of one embodiment of a shaped abrasive particle having grooves.
Figure 2A:
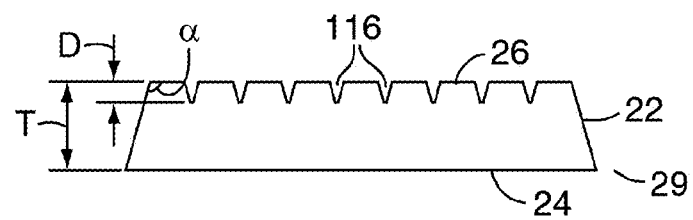
FIG. 2A illustrates a side view of the shaped abrasive particle of FIG. 2.

Referring now to FIGS. 2 and 2A, a shaped abrasive particle 20 having a plurality of grooves 116 made from the mold cavity 102 of FIG. 1 is illustrated. The material from which the shaped abrasive particle 20 with grooves is made comprises alpha alumina. Alpha alumina particles can be made from a dispersion of aluminum oxide monohydrate that is gelled, molded to shape, dried to retain the shape, calcined, and then sintered as discussed later herein. The shaped abrasive particle's shape is retained without the need for a binder to form an agglomerate comprising abrasive particles in a binder that are then formed into a shaped structure.

In general, the shaped abrasive particles 20 with grooves 116 comprise thin bodies having a first face 24, and a second face 26 and having a thickness T. The first face 24 and the second face 26 are connected to each other by a sidewall 22 and the sidewall may be angled to form a sloping sidewall 22 as discussed later herein by using a mold cavity having an angle α greater than 90 degrees between the mold sidewall and the mold bottom surface. The sidewall can be minimized for shaped abrasive particles with faces that taper to a thin edge or point instead or having a thicker sidewall.

In some embodiments, the first face 24 is substantially planar, the second face 26 is substantially planar, or both faces are substantially planar. Alternatively, the faces could be concave or convex as discussed in more detail in copending U.S. application Ser. No. 12/336,961 entitled "Dish-Shaped Abrasive Particles With A Recessed Surface", filed on Dec. 17, 2008, and having. Additionally, an opening or aperture through the faces could be present as discussed in more detail in copending U.S. application Ser. No. 12/337,112 entitled "Shaped Abrasive Particles With An Opening", filed on Dec. 17, 2008, and having. As discussed in the referenced applications, including either a recessed face or an opening in the shaped abrasive particles has been found to significantly enhance the grinding performance.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sidewall 22 of the shaped abrasive particle 20 with grooves 116 can vary and it generally forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they differ in size with one face being larger than the other face. In one embodiment, the perimeter 29 of first face 24 and the perimeter 29 of the second face 26 was a triangular shape that is illustrated.

Referring to FIG. 2A, a draft angle α between the second face 26 and the sidewall 22 of the shaped abrasive particle 20 can be varied to change the relative sizes of each face. In various embodiments of the invention, the draft angle α can be 90 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As will be seen in the Examples, specific ranges for the draft angle α have been found to produce surprising increases in the grinding performance of coated abrasive articles made from the shaped abrasive particles.

The shaped abrasive particles with grooves can be used to make coated abrasive articles as discussed later herein. If the shaped abrasive particles 20 with grooves 116 have a draft angle α greater than 90 degrees (sloping sidewall), the majority of the shaped abrasive particles 20 with grooves will be tipped or leaning to one side when making a coated abrasive article. As discussed later herein, it is believed that this results in improved grinding performance.

Figure 8:
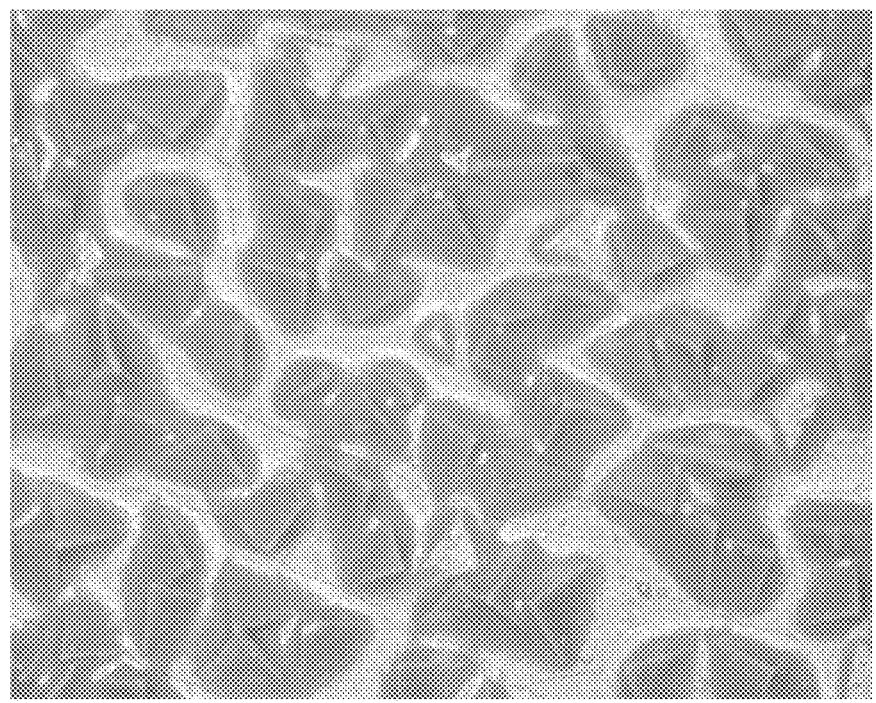
FIG. 8 illustrates a photomicrograph of the top surface of a coated abrasive article made from the shaped abrasive particles of FIG. 7.

To further optimize the leaning orientation, the shaped abrasive particles with grooves and a sloping sidewall can be applied in the backing in an open coat abrasive layer. A closed coat abrasive layer is defined as the maximum weight of abrasive particles or a blend of abrasive particles that can be applied to a make coat of an abrasive article in a single pass through the maker. An open coat is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles as best seen in FIG. 8. In various embodiments of the invention, the percent open area in the abrasive layer can be between about 10% to about 90% or between about 30% to about 80%.

It is believed that if too many of the shaped abrasive particles with grooves and a sloping sidewall are applied to the backing, insufficient spaces between the particles will be present to allow for the particles to lean or tip prior to curing the make and size coats. In various embodiments of the invention, greater than 50, 60, 70, 80, or 90 percent of the shaped abrasive particles in the coated abrasive article having an open coat abrasive layer are tipped or leaning.

Figure 3:
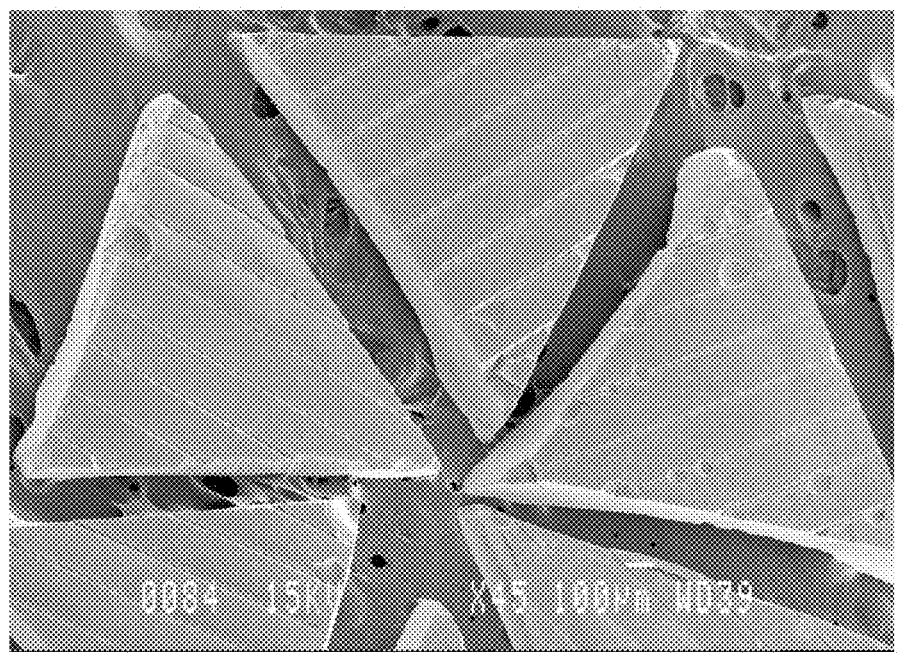
FIG. 3 illustrates a photomicrograph of the shaped abrasive particle with grooves.

Referring now to FIG. 3, a photomicrograph of shaped abrasive particles 20 with grooves 116 and a sloping sidewall is shown. In FIG. 3 the draft angle α is approximately 98 degrees and the shaped abrasive particles comprised an equilateral triangle. The sides of each triangle measured approximately 1.6 mm at the perimeter of the larger first face 24. The dish-shaped abrasive particles had a recessed first face 24 as seen by noting the varying sidewall thickness and the fact that the shaped abrasive particles are resting mainly on the tips or corners of the triangles.

Figure 4:
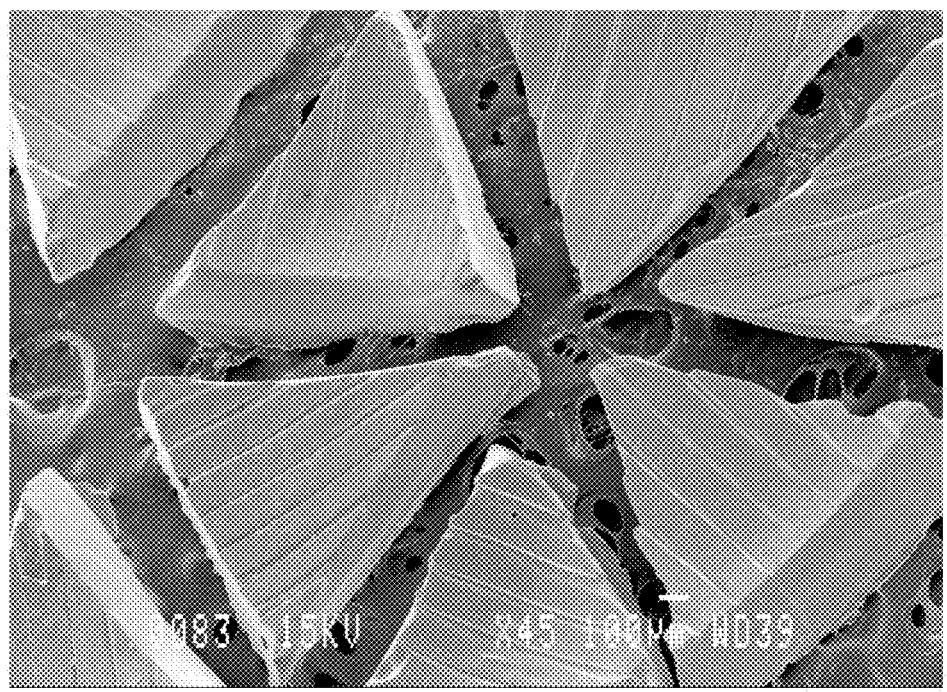
FIG. 4 illustrates a photomicrograph of another embodiment of the shaped abrasive particle with grooves.

Referring now to FIG. 4, a photomicrograph of shaped abrasive particles 20 with grooves 116 is shown. In FIG. 4 the draft angle α of the mold was 98 degrees and the shaped abrasive particles comprised an equilateral triangle. The sides of each triangle measured approximately 1.6 mm at the perimeter of the larger first face 24. The dish-shaped abrasive particles had a concave first face 24 and a convex second face 26 (originally formed on the mold bottom surface). More information on dish-shaped abrasive particles having either a recessed or concave face is disclosed in Ser. No. 12/336,961 mentioned above.

The grooves 116 on the second face 26 are formed by the plurality of ridges 108 on the mold bottom surface. As such, the pattern of grooves on the second face 26 will replicate any of the patterns discussed above for the ridges. In one embodiment, the plurality of grooves comprises parallel lines extending completely across the second face and intersecting with the perimeter along an edge at a 90 degree angle. The grooves cross sectional geometry was a triangle, or can be the other geometries as discussed above.

In various embodiments of the invention, the depth, D, of the plurality of grooves 116 can between about 1 and 400 micrometers. Furthermore, a percentage ratio of the groove depth, D, to the shaped abrasive particle's maximum thickness, T, (D/T expressed as a percent) can be between 0.1% to about 30%, or between 0.1% to about 20%, or between 0.1% to about 10%, or between about 0.5% to about 5%.

The plurality of grooves placed onto the shaped abrasive particle as a result of improving the release capability of the production tooling surprisingly have been found to affect grinding performance of the resulting shaped abrasive particles with grooves. This result occurs even though the groove's depth, D, can be small compared to the shaped abrasive particle's maximum thickness, T. It is unknown whether this result occurs due to increased fracturing of the shaped abrasive particles during use along the grooves, which can form fresh new sharp edges, or because the grooves themselves without fracturing of the shaped abrasive particle provide fresh sharp edges and a slightly reduced wear flat once the shaped abrasive particle with grooves is worn through to expose a particular groove. Since there are multiple grooves per shaped abrasive particle, there are multiple opportunities for the shaped abrasive particle with grooves to re-sharpen itself.

As will be discussed in more detail in the Examples, the plurality of grooves in one embodiment tended to reduce the shaped abrasive particle's initial cut rate and then increase cut rate as the abrasive article was used. Similar size shaped abrasive particles without grooves tended to have a higher initial cut rate and then decrease in cut rate as the abrasive article was used. By blending the shaped abrasive particles with grooves with shaped abrasive particles without grooves, the cut rate of the abrasive article during initial use and later use can be made more uniform. A uniform cut rate is often important to consumers of abrasive articles in order to prevent having to readjust production machinery as the abrasive wears while making standardized parts. In various embodiments, at least 5, 10, 15, 20, 25, 30, 35, 40, 45, 50, 55, 60, 65, 70, 75, 80, 85, 90, or 95 percent by weight of the shaped abrasive particles with grooves can be mixed with shaped abrasive particles without grooves. In one embodiment, a 50%-50% mixture of equilateral triangle shaped abrasive particles with the plurality of grooves and equilateral triangle shaped abrasive particles without the plurality of grooves was found to provide a very uniform cut rate versus time. In various embodiments of the invention, a blend of the shaped abrasive particles can comprise about 40% to about 60% of the shaped abrasive particles with the plurality of grooves and about 40% to about 60% of the shaped abrasive particles without the plurality of grooves.

Figure 5:
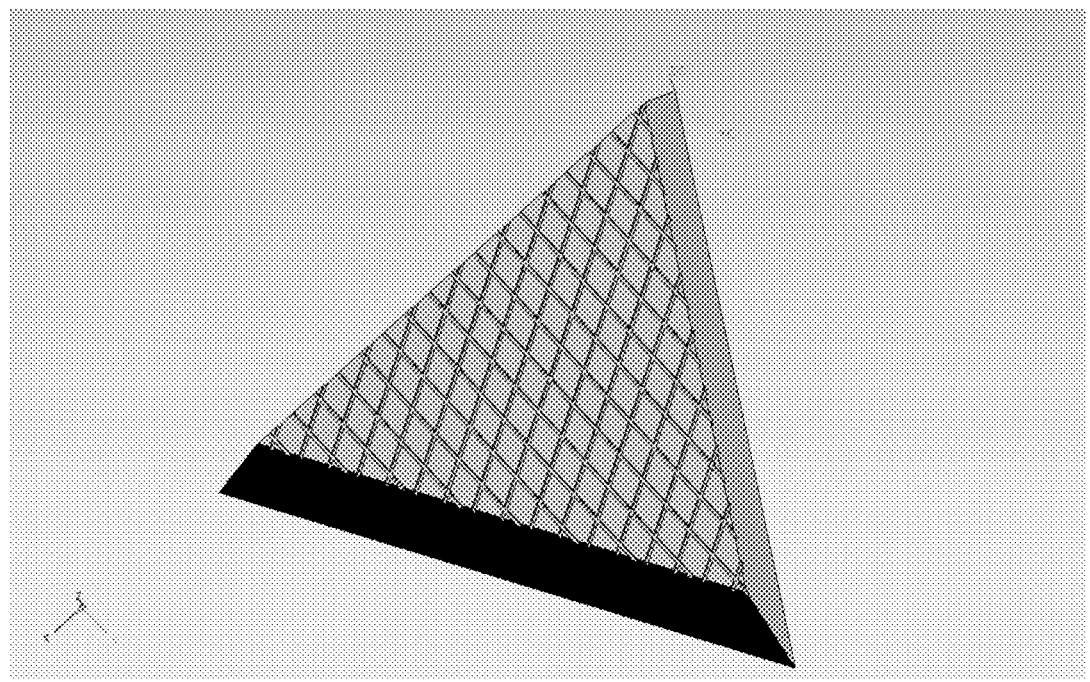
FIG. 5 illustrates another embodiment of the shaped abrasive particle with grooves.

Referring now to FIG. 5 another embodiment for the plurality of grooves on the second face 26 is illustrated. The plurality of grooves comprised a cross hatch pattern of intersecting parallel lines extending completely across the second face 26. A first set of 17 parallel lines intersected one edge of the perimeter at a 90 degree angle having a percent spacing of 6.25% of the edge length of the triangle, and a second set of 17 parallel lines intersected a second edge of the perimeter at a 90 degree angle having a percent spacing of 6.25% creating the cross hatch pattern and forming a plurality of raised diamonds in the second face. In various embodiments, the cross hatch pattern can use intersecting parallel or non-parallel lines, various percent spacing between the lines, arcuate intersecting lines, or various cross-sectional geometries of the grooves.

Shaped Abrasive Particle with a Sloping Sidewall

Figure 6A:
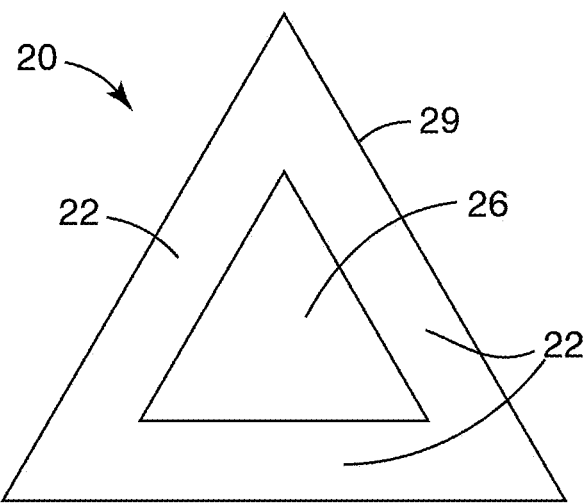
FIG. 6A illustrates a top view of one embodiment of a shaped abrasive particle.
Figure 6B:
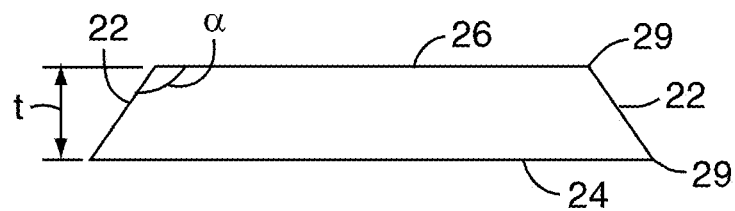
FIG. 6B illustrates a side view the shaped abrasive particle of FIG. 6A.
Figure 6C:
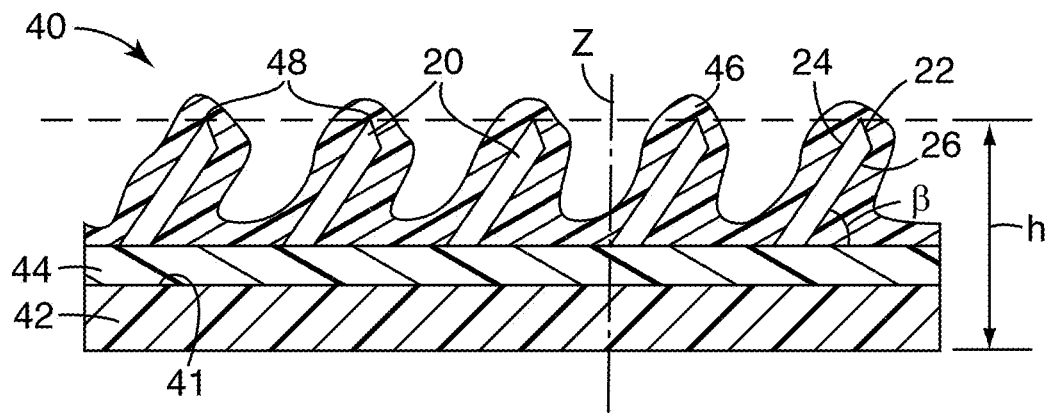
FIG. 6C illustrates a side view of coated abrasive article made from the shaped abrasive particles of FIG. 6A.

Referring to FIGS. 6A, 6B, and 6C an exemplary shaped abrasive particle 20 with a sloping sidewall 22 is illustrated. In the following discussion, any embodiments of the shaped abrasive particles with a sloping sidewall (draft angle α greater than 90 degrees) can be combined with any of the embodiments of the shaped abrasive particles with grooves 116 as discussed above. The material from which the shaped abrasive particle 20 with a sloping sidewall 22 is made comprises alpha alumina. Alpha alumina particles can be made from a dispersion of aluminum oxide monohydrate that is gelled, molded to shape, dried to retain the shape, calcined, and then sintered as discussed herein later.

Figure 9A:
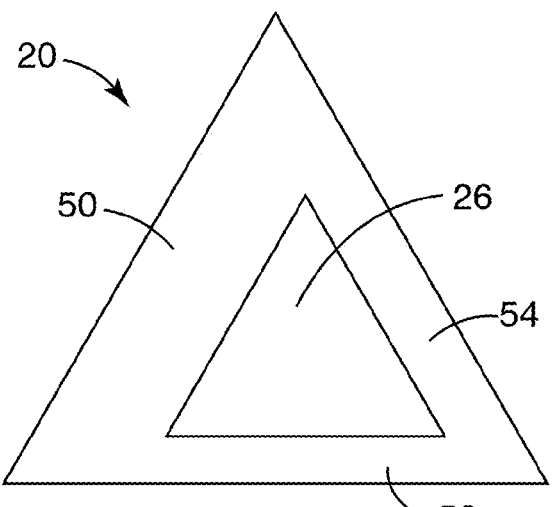
FIG. 9A illustrates a top view of another embodiment of a shaped abrasive particle.

In general, the shaped abrasive particles 20 with a sloping sidewall 22 comprise thin bodies having a first face 24, and a second face 26 and having a thickness t. The first face 24 and the second face 26 are connected to each other by at least one sloping sidewall 22. In some embodiments, more than one sloping sidewall 22 can be present and the slope or angle for each sloping sidewall 22 may be the same as shown in FIG. 6A or different as shown in FIG. 9A.

In some embodiments, the first face 24 is substantially planar, the second face 26 is substantially planar, or both faces are substantially planar. Alternatively, the faces could be concave or convex as discussed in more detail in copending U.S. application Ser. No. 12/336,961 entitled "Dish- Shaped Abrasive Particles With A Recessed Surface", filed on Dec. 17, 2008. Additionally, an opening or aperture through the faces could be present as discussed in more detail in copending U.S. application Ser. No. 12/337,112 entitled "Shaped Abrasive Particles With An Opening", filed on Dec. 17, 2008.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sloping sidewall 22 of the shaped abrasive particle 20 with a sloping sidewall 22 can vary and it generally forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they differ in size with one face being larger than the other face. In one embodiment, the perimeter 29 of first face 24 and the perimeter 29 of the second face 26 was a triangular shape that is illustrated.

Referring to FIGS. 6B and 6C, a draft angle $\alpha$ between the second face 26 and the sloping sidewall 22 of the shaped abrasive particle 20 can be varied to change the relative sizes of each face. In various embodiments of the invention, the draft angle $\alpha$ can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As will be seen in the Examples, specific ranges for the draft angle $\alpha$ have been found to produce surprising increases in the grinding performance of coated abrasive articles made from the shaped abrasive particles with a sloping sidewall.

Referring now to FIG. 6C, a coated abrasive article 40 is shown having a first major surface 41 of a backing 42 covered by an abrasive layer. The abrasive layer comprises a make coat 44, and a plurality of shaped abrasive particles 20 with a sloping sidewall 22 attached to the backing 42 by the make coat 44. A size coat 46 is applied to further attach or adhere the shaped abrasive particles 20 with a sloping sidewall 22 to the backing 42.

As seen, the majority of the shaped abrasive particles 20 with a sloping sidewall 22 are tipped or leaning to one side. This results in the majority of the shaped abrasive particles 20 with a sloping sidewall 22 having an orientation angle $\beta$ less than 90 degrees relative to the first major surface 41 of the backing 42. This result is unexpected since the electrostatic coating method of applying the shaped abrasive particles with a sloping sidewall tends to originally orientate the particles at an orientation angle $\beta$ of 90 degrees when they are first applied to the backing. The electrostatic field tends to align the particles vertically when applying them to the backing that is located above the shaped abrasive particles with a sloping sidewall. Furthermore, the electrostatic field tends to accelerate and drive the particles into the make coat at the 90 degree orientation. At some point after the web is turned over, either before or after the size coat 46 is applied, the particles under the force of gravity or the surface tension of the make and/or size coat tend to lean over and come to rest on the sloping sidewall 22. It is believed that sufficient time in the process of making the coated abrasive article is present for the shaped abrasive particles to lean over and become attached to the make coat by the sloping sidewall 22 before the make coat and size coat cure and harden preventing any further rotation. As seen, once the shaped abrasive particles with a sloping sidewall are applied and allowed to lean, the very tips 48 of the shaped abrasive particles have generally the same height, h.

To further optimize the leaning orientation, the shaped abrasive particles with a sloping sidewall are applied in the backing in an open coat abrasive layer. A closed coat abrasive layer is defined as the maximum weight of abrasive particles or a blend of abrasive particles that can be applied to a make coat of an abrasive article in a single pass through the maker. An open coat is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles as best seen in FIG. 8. In various embodiments of the invention, the percent open area in the abrasive layer can be between about 10% to about 90% or between about 30% to about 80%.

It is believed that if too many of the shaped abrasive particles with a sloping sidewall are applied to the backing, insufficient spaces between the particles will be present to allow from them to lean or tip prior to curing the make and size coats. In various embodiments of the invention, greater than 50, 60, 70, 80, or 90 percent of the shaped abrasive particles in the coated abrasive article having an open coat abrasive layer are tipped or leaning having an orientation angle $\beta$ of less than 90 degrees.

Without wishing to be bound by theory, it is believed that an orientation angle $\beta$ less than 90 degrees results in enhanced cutting performance of the shaped abrasive particles with a sloping sidewall. Surprisingly, this result tends to occur regardless of the shaped abrasive particles' rotational orientation about the Z axis within the coated abrasive article. While FIG. 6C is idealized to show all the particles aligned in the same direction, an actual coated abrasive disc would have the particles randomly distributed and rotated as best seen in FIG. 8. Since the abrasive disc is rotating and the shaped abrasive particles are randomly distributed, some shaped abrasive particles will be driven into the workpiece at an orientation angle $\beta$ of less than 90 degrees with the workpiece initially striking the second face 26 while a neighboring shaped abrasive particle could be rotated exactly 180 degrees with the workpiece striking backside of the shaped abrasive particle and the first face 24. With a random distribution of the particles and the rotation of the disc, less than half of the shaped abrasive particles could have the workpiece initially striking the second face 26 instead of the first face 24. However, for an abrasive belt having a defined direction of rotation and a defined point of contact with the workpiece, it may be possible to align the shaped abrasive particles with a sloping sidewall on the belt to ensure that each shaped abrasive particle runs at an orientation angle $\beta$ of less than 90 degrees and that the workpiece is driven into the second face 26 first as idealized in FIG. 6C. In various embodiments of the invention, the orientation angle $\beta$ for at least a majority of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

Figure 7:
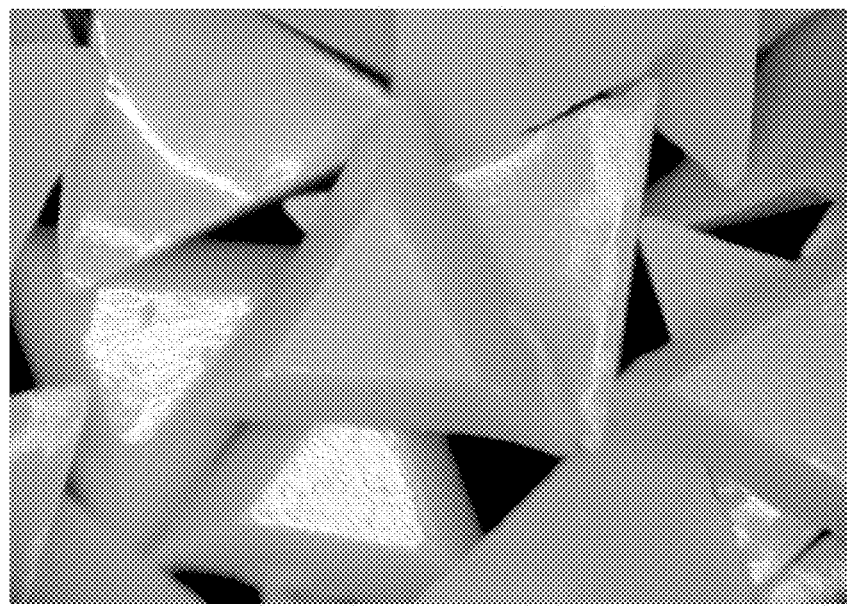
FIG. 7 illustrates a photomicrograph of the shaped abrasive particles.

Referring now to FIGS. 7 and 8, photomicrographs of shaped abrasive particles 20 with a sloping sidewall 22 are shown. In FIG. 7 the draft angle α is approximately 120 degrees and the shaped abrasive particles comprised an equilateral triangle. The sides of each triangle measured approximately 1.6 mm at the perimeter of the larger first face 24. The shaped abrasive particles had a thickness of approximately 0.38 mm. The surface of the resulting coated abrasive disc made from the shaped abrasive particles of FIG. 7 is shown in FIG. 8. As seen, the majority of the shaped abrasive particles are resting in the make coat on one of the sloping sidewalls. The orientation angle β for the majority of the shaped abrasive particles with a sloping sidewall in the abrasive layer of the coated abrasive article in FIG. 3 is approximately 60 degrees.

Figure 9B:
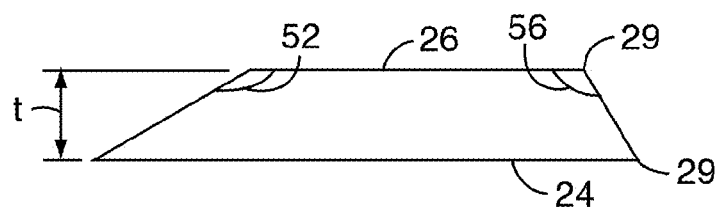
FIG. 9B illustrates a side view the shaped abrasive particle of FIG. 9A.
Figure 9C:
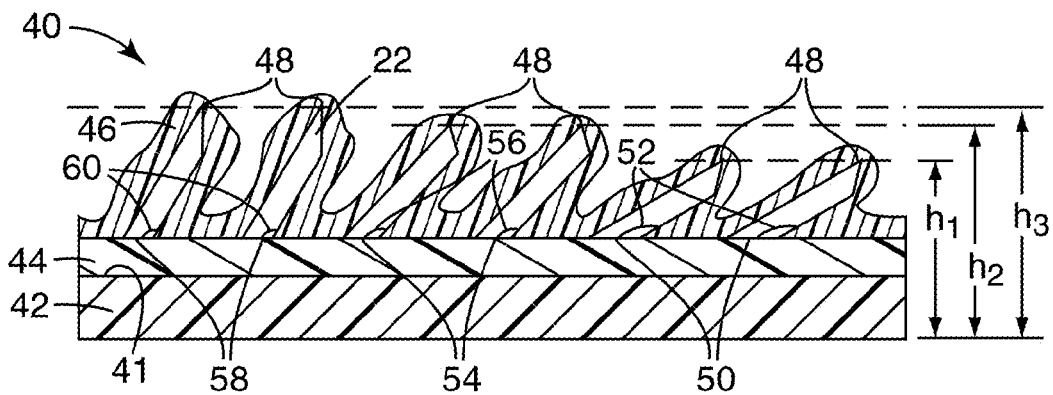
FIG. 9C illustrates a side view of coated abrasive article made from the shaped abrasive particles of FIG. 9A.

Referring to FIGS. 9A-C, a second embodiment of the shaped abrasive particle 20 with a sloping sidewall 22 is illustrated. The material from which the shaped abrasive particle 20 with a sloping sidewall 22 is made comprises alpha alumina. Alpha alumina particles can be made from a dispersion of aluminum oxide monohydrate that is gelled, molded to shape, dried to retain the shape, calcined, and then sintered as discussed herein later.

In general, the shaped abrasive particles 20 with a sloping sidewall 22 comprise thin bodies having a first face 24, and a second face 26 and having a thickness t. The first face 24 and the second face 26 are connected to each other by at least a first sloping sidewall 50 having a first draft angle 52 and by a second sloping sidewall 54 having a second draft angle 56, which is selected to be a different value from the first draft angle. In the illustrated embodiment, the first and second faces are also connected by a third sloping sidewall 58 having a third draft angle 60, which is a different value from either of the other two draft angles.

In the illustrated embodiment, the first, second and third draft angles are all different values from each other. For example, the first draft angle 52 could be 120 degrees, the second draft angle 56 could be 110 degrees, and the third draft angle 60 could be 100 degrees. The resulting coated abrasive article 40, as shown in FIG. 4C, made from the shaped abrasive particles with the three different draft angles will tend to have an even distribution of shaped abrasive particles landing on each of the three different sloping sidewalls. As such, the coated abrasive article will tend to have three distinct heights for the tips 48 of the shaped abrasive particles from the backing. The first sloping sidewall 50 contacting the make coat with the largest draft angle will have the lowest tip height, h1, the second sloping sidewall 54 with the intermediate draft angle will have an intermediate tip height, h2, and the third sloping sidewall, 58, with the smallest draft angle will have the highest tip height, h3. As a result, the coated abrasive article will possess shaped abrasive particles having three distinct orientation angles 13 relative to the backing and three distinct tip heights. It is believed that such a coated abrasive article will possess more uniform cutting performance as the abrasive article wears due to the unused shorter tips of the shaped abrasive particles coming into contact with the workpiece as the taller tips of the shaped abrasive particles tend to wear down and dull.

In some embodiments, the first face 24 is substantially planar, the second face 26 is substantially planar, or both faces are substantially planar. Alternatively, the faces could be concave or convex as discussed in more detail in copending U.S. application Ser. No. 12/336,961 entitled "Dish-Shaped Abrasive Particles With A Recessed Surface", filed on Dec. 17, 2008. Additionally, an opening or aperture through the faces could be present as discussed in more detail in copending U.S. application Ser. No. 12/337,112 entitled "Shaped Abrasive Particles With An Opening", filed on Dec. 17, 2008.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The first, second, and third sloping sidewalls of the shaped abrasive particle 20 with a sloping sidewall 22 can vary and they generally form the perimeter 29 of the first face 24 and the second face 26. In one embodiment, the perimeter 29 of the first face 24 and the second face 26 is selected to be a geometric shape, and the first face 24 and the second face 26 are selected to have the same geometric shape, although, they differ in size with one face being larger than the other face. In one embodiment, the perimeter 29 of first face 24 and the perimeter 29 of the second face 26 was a triangular shape that is illustrated.

Referring to FIGS. 9B and 9C, the first, second, and third, draft angles between the second face 26 and the respective sloping sidewall of the shaped abrasive particle 20 can be varied with at least two of the draft angles being different values, and desirably all three being different values. In various embodiments of the invention, the first draft angle, the second draft angle, and the third draft angle can be between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

Referring now to FIG. 9C, a coated abrasive article 40 is shown having a first major surface 41 of a backing 42 covered by an abrasive layer. The abrasive layer comprises a make coat 44, and a plurality of shaped abrasive particles 20 with either the first, the second, or the third sloping sidewall attached to the backing 42 by the make coat 44. A size coat 46 is applied to further attach or adhere the shaped abrasive particles 20 with a sloping sidewall 22 to the backing 42.

As seen, the majority of the shaped abrasive particles 20 with a sloping sidewall 22 are tipped or leaning to one side. This results in the majority of the shaped abrasive particles 20 with a sloping sidewall 22 having an orientation angle β less than 90 degrees relative to the first major surface 41 of the backing 42 as previously discussed for the first embodiment.

To further optimize the leaning orientation, the shaped abrasive particles with a sloping sidewall are applied in the backing in an open coat abrasive layer. An open coat abrasive layer will result in less than 100% coverage of the make coat with abrasive particles thereby leaving open areas and a visible resin layer between the abrasive particles as best seen in FIG. 8. In various embodiments of the invention, the percent open area in the abrasive layer can be between about 10% to about 90% or between about 30% to about 80%.

It is believed that if too many of the shaped abrasive particles with a sloping sidewall are applied to the backing, insufficient spaces between the shaped abrasive particles will be present to allow for them to lean or tip prior to curing the make and size coats. In various embodiments of the invention, greater than 50, 60, 70, 80, or 90 percent of the shaped abrasive particles in the coated abrasive article having an open coat abrasive layer are tipped or leaning having an orientation angle β of less than 90 degrees.

Without wishing to be bound by theory, it is believed that an orientation angle β of less than 90 degrees results in enhanced cutting performance of the shaped abrasive particles with a sloping sidewall as previously discussed. In various embodiments of the invention, the orientation angle β for at least a majority of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

Figure 10A:
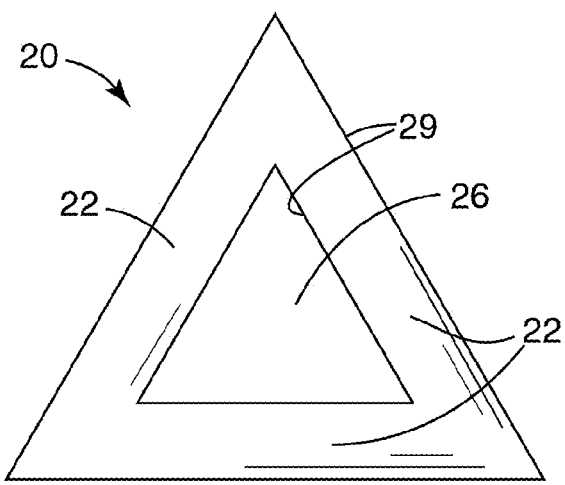
FIG. 10A illustrates a top view of another embodiment of a shaped abrasive particle.
Figure 10B:
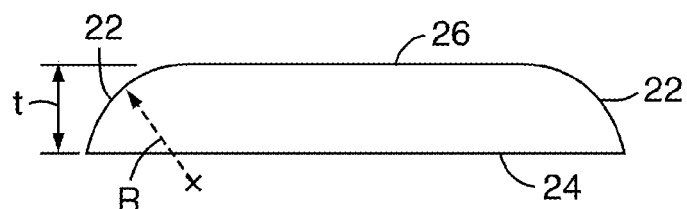
FIG. 10B illustrates a side view the shaped abrasive particle of FIG. 10A.
Figure 10C:
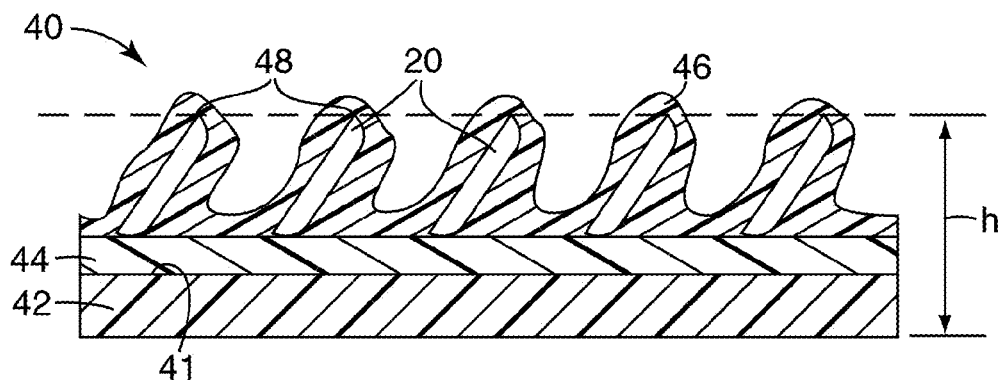
FIG. 10C illustrates a side view of coated abrasive article made from the shaped abrasive particles of FIG. 10A.

Referring now to FIGS. 10A-B a third embodiment of the invention is shown. In this embodiment, the sloping sidewall 22 is defined by a radius, R, instead of the draft angle α for the embodiment shown in FIGS. 6A-6C. A sloping sidewall 22 defined by a radius, R, has also been found to result in the shaped abrasive particles 20 tipping or leaning when forming a coated abrasive article as shown in FIG. 10C. Grinding tests have shown that shaped abrasive particles comprising an equilateral triangle with the sides of each triangle measuring approximately 1.6 mm at the perimeter of the larger first face 24, and having a thickness of approximately 0.38 mm, have the same cut performance with a draft angle of 120 degrees or a radius, R, of 0.51 mm. In various embodiment of the invention, the radius, R, can be between about 0.5 to about 2 times the thickness, t, of the shaped abrasive particle.

As with the second embodiment, the radius, R, can be varied for each of the sidewalls to result in shaped abrasive particles leaning or tipping to varying degrees in the coated abrasive article.

It is believed that if too many of the shaped abrasive particles with a sloping sidewall are applied to the backing, insufficient spaces between the shaped abrasive particles will be present to allow for them to lean or tip prior to curing the make and size coats. In various embodiments of the invention, greater than 50, 60, 70, 80, or 90 percent of the shaped abrasive particles in the coated abrasive article having an open coat abrasive layer are tipped or leaning having an orientation angle β of less than 90 degrees.

For either the first embodiment, the second embodiment, or the third embodiment, the shaped abrasive particles 20 with a sloping sidewall 22 can have various three-dimensional shapes. The geometric shape of the perimeter 29 can be triangular, rectangular, circular, elliptical, star-shaped or that of other regular or irregular polygons. In one embodiment, an equilateral triangle is used and in another embodiment, an isosceles triangle is used. For the purpose of this disclosure, a substantially triangular shape also includes three-sided polygons wherein one or more of the sides can be arcuate and/or the tips of the triangle can be arcuate.

Additionally, the various sloping sidewalls of the shaped abrasive particles can have the same draft angle or different draft angles. Furthermore, a draft angle of 90 degrees can be used on one or more sidewalls as long as one of the sidewalls is a sloping sidewall having a draft angle of about 95 degrees or greater.

The shaped abrasive particles 20 with a sloping sidewall can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25A, the volumetric aspect ratio is increased to 2.64. It is believed that shaped abrasive particles having a larger volumetric aspect ratio have enhanced cutting performance. In various embodiments of the invention, the volumetric aspect ratio for the shaped abrasive particles with a sloping sidewall can be greater than about 1.15, or greater than about 1.50, or greater than about 2.0, or between about 1.15 to about 10.0, or between about 1.20 to about 5.0, or between about 1.30 to about 3.0.

The shaped abrasive particles with a sloping sidewall can have a much smaller radius of curvature at the points or corners of the shaped abrasive particles. The equilateral triangular shaped abrasive particles disclosed in U.S. Pat. No. 5,366,523 to Rowenhorst et al. and pictured in FIG. 14, had a radius of curvature for the points of the triangle (measured from one side around the point to the next side) of 103.6 microns for the average tip radius. The radius of curvature can be measured from a polished cross-section of the first or second face using image analysis such as a Clemex Image Analysis program interfaced with an inverted light microscope or other suitable image analysis software. The radius of curvature for each triangular apex can be estimated by defining three points at each apex when viewed in cross section at 100× magnification. A point is placed at the start of the tip's curve where there is a transition from the straight edge to the start of a curve, at the apex of the tip, and at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius. The shaped abrasive particles made by the current method are much more precisely made as best seen by comparing FIG. 7 to FIG. 14. As such, the average tip radius for the shaped abrasive particles is much less. The average tip radius for shaped abrasive particles made according to the present disclosure has been measured to be less than 19.2 microns. In various embodiments of the invention, the average tip radius can be less than 75 microns, or less than 50 microns, or less than 25 microns. It is believed that a sharper tip promotes more aggressive cutting an improved fracturing of the shaped abrasive particles during use.

Figure 14:
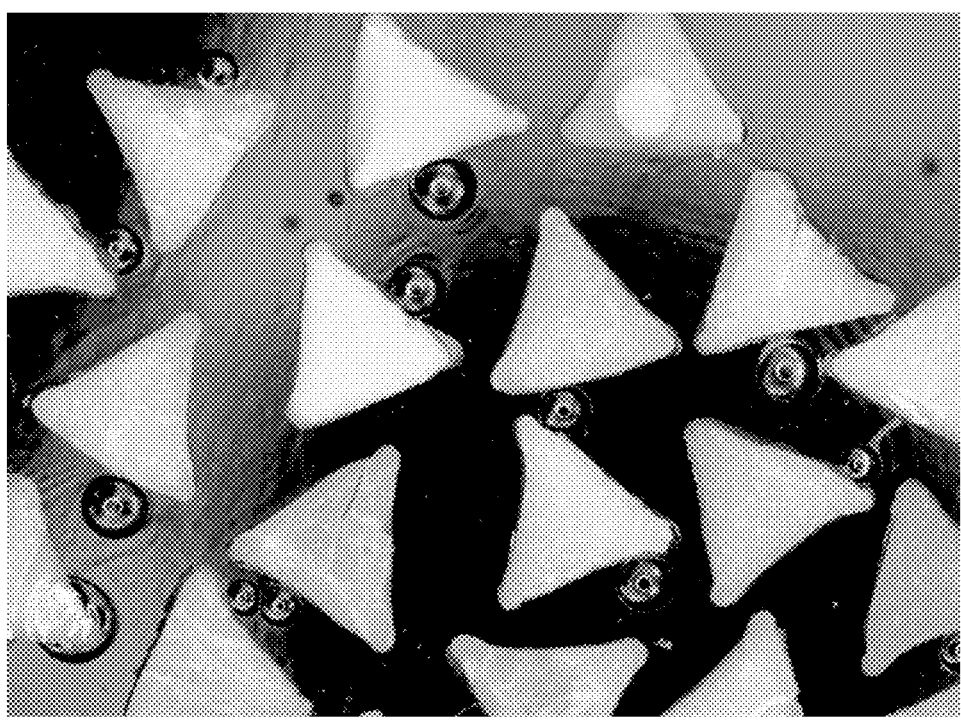
FIG. 14 illustrates a photomicrograph of prior art abrasive particles made according to U.S. Pat. No. 5,366,523.
Figure 15:
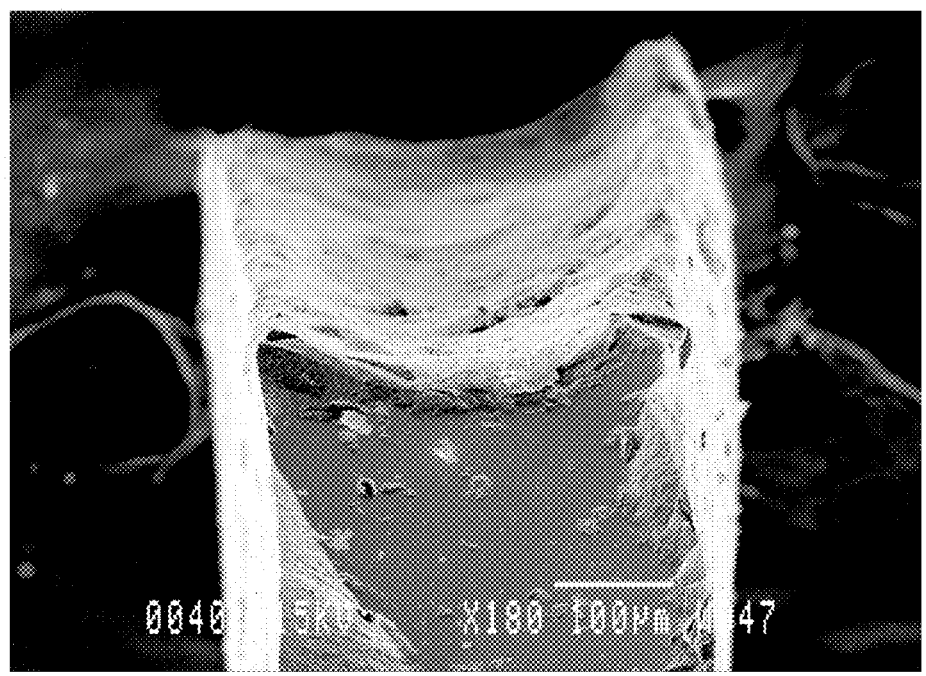
FIG. 15 illustrates a photomicrograph of a cross section of the prior art abrasive particles of FIG. 14.
Figure 16:
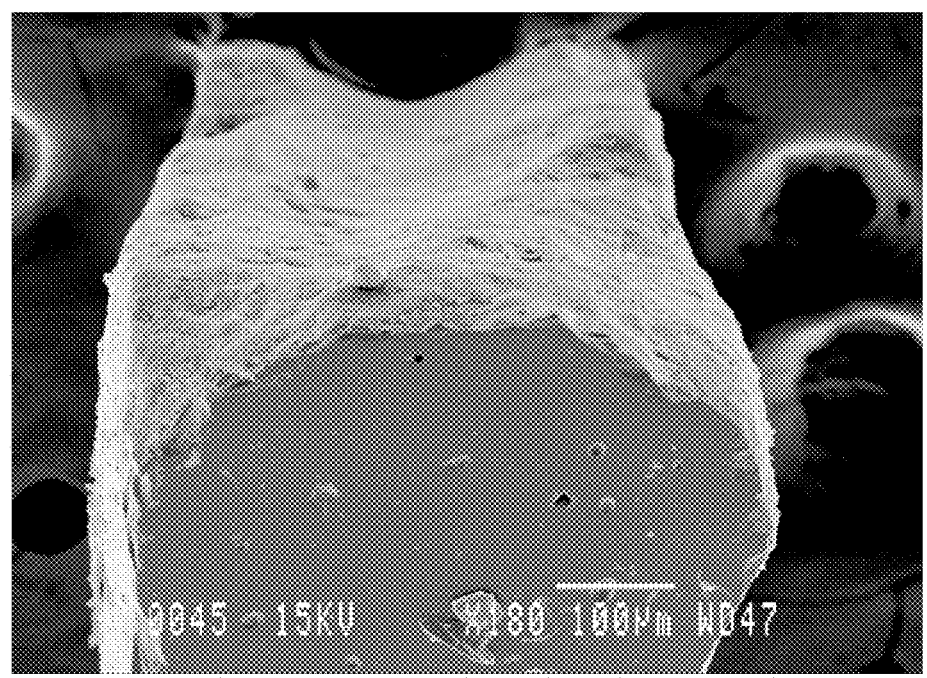
FIG. 16 illustrates a photomicrograph of a cross section of the prior art abrasive particles of FIG. 14.

In addition to having a sharper tip, the shaped abrasive particles can have a much more precisely defined sidewall. Referring now to FIGS. 15 and 16, photomicrographs of polished cross sections taken perpendicular through the faces of the prior art shaped abrasive particles of FIG. 14 are shown. As seen, the sidewall (top surface) tends to be either concave or convex and is not uniformly planar. Depending on where you take the cross section, the same sidewall may transition from one shape to another. Referring to FIG. 16, in the foreground the sidewall is convex while in the background it is concave.

Figure 17:
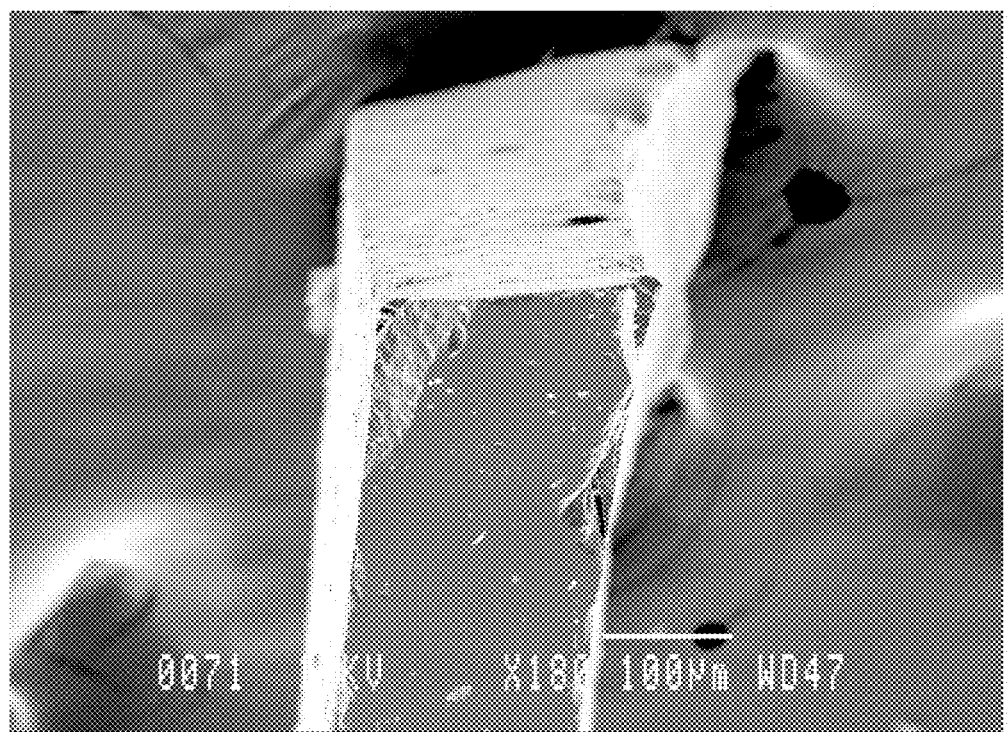
FIG. 17 illustrates a photomicrograph of a cross section of a shaped abrasive particle with a sloping sidewall.

Referring to FIG. 17, a polished cross section taken perpendicular through the faces of a shaped abrasive particle with a sloping sidewall having a 98 degree draft angle is shown. The first face 24 (right hand vertical surface) is concave as disclosed in the pending patent application Ser.

No. 12/336,961 referred to above. A concave surface is thought to enhance grinding performance by removing more material during use similar to a scoop, spoon, or hollow ground chisel blade. The second face 26 is substantially planar (left hand vertical surface). Finally, the sidewall (top surface) is uniformly planar. By uniformly planar it is meant that the sidewall does not have areas that are convex from one face to the other face, or areas that are concave from one face to the other face and at least 50%, or at least 75%, or at least 85% or more of the sidewall surface is planar. As seen in the cross section, when the sidewall is cut at a 90 degree angle and polished, a substantially linear edge appears (where the top sidewall surface meets the cut cross section's front surface). The uniformly planar sidewall would typically have that substantially linear edge at substantially all cross sectional planes along the length of the sidewall. The uniformly planar sidewall provides better defined (sharper) edges where the sidewall intersects with the first face and the second face, and this is also thought to enhance grinding performance.

Shaped abrasive particles 20 with a sloping sidewall 22 and/or grooves 116 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles 20 with a sloping sidewall 22 and/or grooves 116 can graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the shaped abrasive particles 20 pass through a test sieve meeting ASTM E-11 specifications for the number 18 sieve and are retained on a test sieve meeting ASTM E-11 specifications for the number 20 sieve. In one embodiment, the shaped abrasive particles 20 with a sloping sidewall 22 have a particle size such that most of the particles pass through an 18 mesh test sieve and can be retained on a 20, 25, 30, 35, 40, 45, or 50 mesh test sieve. In various embodiments of the invention, the shaped abrasive particles 20 with a sloping sidewall 22 can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of shaped abrasive particles having an abrasives industry specified nominal grade or nominal screened grade, wherein at least a portion of the plurality of abrasive particles are shaped abrasive particles 20 with a sloping sidewall 22 and/or grooves 116. In another aspect, the disclosure provides a method comprises grading the shaped abrasive particles 20 made according to the present disclosure to provide a plurality of shaped abrasive particles 20 having an abrasives industry specified nominal grade or a nominal screened grade.

If desired, the shaped abrasive particles 20 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are shaped abrasive particles 20 made according to the present disclosure, based on the total weight of the plurality of abrasive particles.

Particles suitable for mixing with the shaped abrasive particles 20 with a sloping sidewall 22 and/or grooves 116 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 with a sloping sidewall 22 (triangles and squares for example) or blends of shaped abrasive particles 20 with different draft angles (for example particles having an 98 degree draft angle mixed with particles having a 120 degree draft angle) can be used in the articles of this invention.

The shaped abrasive particles 20 may also have a surface coating. Surface coatings are known to improve the adhesion between abrasive grains and the binder in abrasive articles or can be used to aid in electrostatic deposition of the shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Abrasive Article Having Shaped Abrasive Particles with a Sloping Sidewall

Referring to FIGS. 1C, 4C, and 5C, a coated abrasive article 40 comprises a backing 42 having a first layer of binder, hereinafter referred to as the make coat 44, applied over a first major surface 41 of backing 42. Attached or partially embedded in the make coat 44 are a plurality of shaped abrasive particles 20 with a sloping sidewall 22 and/or grooves 116 forming an abrasive layer. Over the shaped abrasive particles 20 with a sloping sidewall 22 is a second layer of binder, hereinafter referred to as the size coat 46. The purpose of make coat 44 is to secure shaped abrasive particles 20 with n sloping sidewall 22 to backing 42 and the purpose of size coat 46 is to reinforce shaped abrasive particles 20 with a sloping sidewall 22. The majority of the shaped abrasive particles 20 with a sloping sidewall 22 are oriented such that the tip 48 or vertex points away from the backing 42 and the shaped abrasive particles are resting on the sloping sidewall 22 and tipped or leaning as shown.

The make coat 44 and size coat 46 comprise a resinous adhesive. The resinous adhesive of the make coat 44 can be the same as or different from that of the size coat 46. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 44 or size coat 46, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof.

It is also within the scope of this invention that the shaped abrasive particles 20 with a sloping sidewall 22 and/or grooves 116 can be utilized in a bonded abrasive article, a nonwoven abrasive article, or abrasive brushes. A bonded abrasive can comprises a plurality of the shaped abrasive particles 20 bonded together by means of a binder to form a shaped mass. The binder for a bonded abrasive can be metallic, organic, or vitreous. A nonwoven abrasive comprises a plurality of the shaped abrasive particles 20 bonded into a fibrous nonwoven web by means of an organic binder.

Method of Making Shaped Abrasive Particles with a Sloping Sidewall

The first process step involves providing either a seeded on un-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 with a sloping sidewall 22 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. The production tool comprises polymeric material. Examples of suitable polymeric materials include thermoplastics such as polyesters, polycarbonates, poly(ether sulfone), poly(methyl methacrylate), polyurethanes, polyvinylchloride, polyolefins, polystyrene, polypropylene, polyethylene or combinations thereof, and thermosetting materials. In one embodiment, the entire tooling is made from a polymeric or thermoplastic material. In another embodiment, the surfaces of the tooling in contact with the sol-gel while drying, such as the surfaces of the plurality of cavities (mold bottom surface and mold sidewall) comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. A polymeric or thermoplastic sheet material can be heated along with the master tool such that the material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavity can extend for the entire thickness of mold. Alternatively, the cavity can extend only for a portion of the thickness of the mold. In one embodiment, the top surface is substantially parallel to bottom surface of the mold with the cavities having a substantially uniform depth. At least one side of the mold, i.e. the side in which the cavity is formed, can remain exposed to the surrounding atmosphere during the step in which the volatile component is removed.

The cavity has a specified three-dimensional shape. In one embodiment, the shape of a cavity can be described as being a triangle, as viewed from the top, having a sloping sidewall such that the bottom surface of the cavity is slightly smaller than the opening in the top surface. A sloping sidewall is believed to enhance grinding performance and enable easier removal of the precursor abrasive particles from the mold. In another embodiment, the mold comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired. In one embodiment, the top surface of the mold is coated with the abrasive dispersion. The abrasive dispersion can be pumped onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a small portion of the abrasive dispersion can remain on top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting shaped abrasive particles 20.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90 degrees C. to about 165 degrees C., or between about 105 degrees C. to about 150 degrees C., or between about 105 degrees C. to about 120 degrees C. Higher temperatures can lead to the formation of larger openings but can also lead to degradation of the polypropylene tooling limiting its useful life as a mold.

In one embodiment, a sample of boehmite sol-gel was made using the following recipe: aluminum oxide monohydrate powder (1600 parts) having the trade designation "DISPERAL" was dispersed by high shear mixing a solution containing water (2400 parts) and 70% aqueous nitric acid (72 parts) for 11 minutes. The resulting sol-gel was aged for at least 1 hour before coating. The sol-gel was forced into production tooling having triangular shaped mold cavities of 28 mils depth and 110 mils on each side and having a predetermined draft angle α between the mold sidewall and mold bottom surface of 98 degrees. During manufacture of the production tooling, 50% of the mold cavities comprised ridges on the mold bottom surface thereby forming the shaped abrasive particles of FIGS. 3 and 4, and the other 50% of the mold cavities had a smooth bottom surface.

The sol-gel was forced into the cavities with a putty knife so that the openings of the production tooling were completely filled. A mold release agent, 1% peanut oil in methanol was used to coat the production tooling such that about 0.5 mg/in$^2$ of peanut oil was applied to the mold surfaces. The excess methanol was removed by placing sheets of the production tooling in an air convection oven for 5 minutes at 45 C. The sol-gel coated production tooling was placed in an air convection oven at 45 C for at least 45 minutes to dry. The precursor shaped abrasive particles were removed from the production tooling by passing it over an ultrasonic horn. These precursor shaped abrasive particles can be fired to produce shaped abrasive particles 20 with a sloping sidewall 22 and/or grooves 116.

The fifth process step involves removing the precursor shaped abrasive particles with a sloping sidewall from the mold cavities. The precursor shaped abrasive particles with a sloping sidewall can be removed from the cavities by using the following processes alone or in combination on the mold: gravity, vibration, ultrasonic vibration, vacuum, or pressurized air to remove the particles from the mold cavities.

The precursor abrasive particles with a sloping sidewall can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the precursor shaped abrasive particles with a sloping sidewall 22. During calcining, essentially all the volatile material is removed, and the various components that were present in the abrasive dispersion are transformed into metal oxides. The precursor shaped abrasive particles are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are prefixed again. This option is further described in European Patent Application No. 293,163.

The seventh process step involves sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1,000 degrees C. to 1,650 degrees C. and maintaining them within this temperature range until substantially all of the alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the shaped abrasive particles with a sloping sidewall can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser. More information concerning methods to make shaped abrasive particles is disclosed in copending U.S. patent application Ser. No. 12/337,001 entitled "Method Of Making Abrasive Shards, Shaped Abrasive Particles With An Opening, Or Dish-Shaped Abrasive Particles", and filed on Dec. 17, 2008.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Preparation of REO-Doped Shaped Abrasive Particles

A sample of boehmite sol-gel was made using the following recipe: aluminum oxide monohydrate powder (1600 parts) having the trade designation "DISPERAL" was dispersed by high shear mixing a solution containing water (2400 parts) and 70% aqueous nitric acid (72 parts) for 11 minutes. The resulting sol-gel was aged for at least 1 hour before coating. The sol-gel was forced into production tooling having triangular shaped mold cavities of 28 mils depth and 110 mils on each side. The draft angle α between the mold sidewall and mold bottom surface was different for each production tooling. The draft angle α was 90 degrees for the first tooling, 98 degrees for the second tooling, 120 degrees for the third tooling and 135 degrees for the last tooling. The 98 degree draft angle production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described above. The sol-gel was forced into the cavities with a putty knife so that the openings of the production tooling were completely filled. A mold release agent, 1% peanut oil in methanol was used to coat the production tooling with about 0.5 mg/in$^2$ of peanut oil applied to the production tooling. The excess methanol was removed by placing sheets of the production tooling in an air convection oven for 5 minutes at 45 degrees C. The sol-gel coated production tooling was placed in an air convection oven at 45 degrees C. for at least 45 minutes to dry. The precursor shaped abrasive particles were removed from the production tooling by passing it over an ultrasonic horn. The precursor shaped abrasive particles were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated precursor shaped abrasive particles with openings were allowed to dry after which the particles were again calcined at 650 degrees Celsius and sintered at approximately 1400 degrees Celsius. Both the calcining and sintering was performed using rotary tube kilns.

After making the shaped abrasive particles with sloping sidewalls having the four different draft angles, coated abrasive discs were made. The shaped abrasive particles with sloping sidewalls and/or grooves 116 were electrostatic coated onto a 7 inch diameter fiber disc with a ⅞ inch center hole using phenolic make coat and size coat resins as shown in Table 1. The phenolic resin can be made from resole phenol-formaldehyde resin, a 1.5:1 to 2.1:1 (phenol:formaldehyde) condensate catalyzed by 1 to 5% potassium hydroxide.

TABLE 1

Make and Size Coat Formulation

| Ingredient | Make Coat | Size Coat |
|---|---|---|
| Phenolic Resin | 49.15% | 29.42% |
| Water | 10.19% | 18.12% |
| Calcium Carbonate | 40.56% | 0.0% |
| Cryolite | 0.0% | 50.65% |
| Emulon A (BASF) | 0.10% | 1.81% |
| | 100.0% | 100.0% |

The grinding performance of the shaped abrasive particles with a sloping sidewall and/or grooves 116 was evaluated by grinding 1045 medium carbon steel using the following procedure. 7-inch (17.8 cm) diameter abrasive discs for evaluation were attached to a rotary grinder fitted with a 7-inch (17.8 cm) ribbed disc pad face plate ("80514 Extra Hard Red" obtained from 3M Company, St. Paul, Minn.). The grinder was then activated and urged against an end face of a 0.75×0.75 in (1.9×1.9 cm) pre-weighed 1045 steel bar under a load of 12 lb (5.4 kg). The resulting rotational speed of the grinder under this load and against this workpiece was 5000 rpm. The workpiece was abraded under these conditions for a total of fifty (50) 10-second grinding intervals (passes). Following each 10-second interval, the workpiece was allowed to cool to room temperature and weighed to determine the cut of the abrasive operation. Test results were reported as the incremental cut for each interval and the total cut removed. If desired, the testing can be automated using suitable equipment.

Figure 11:
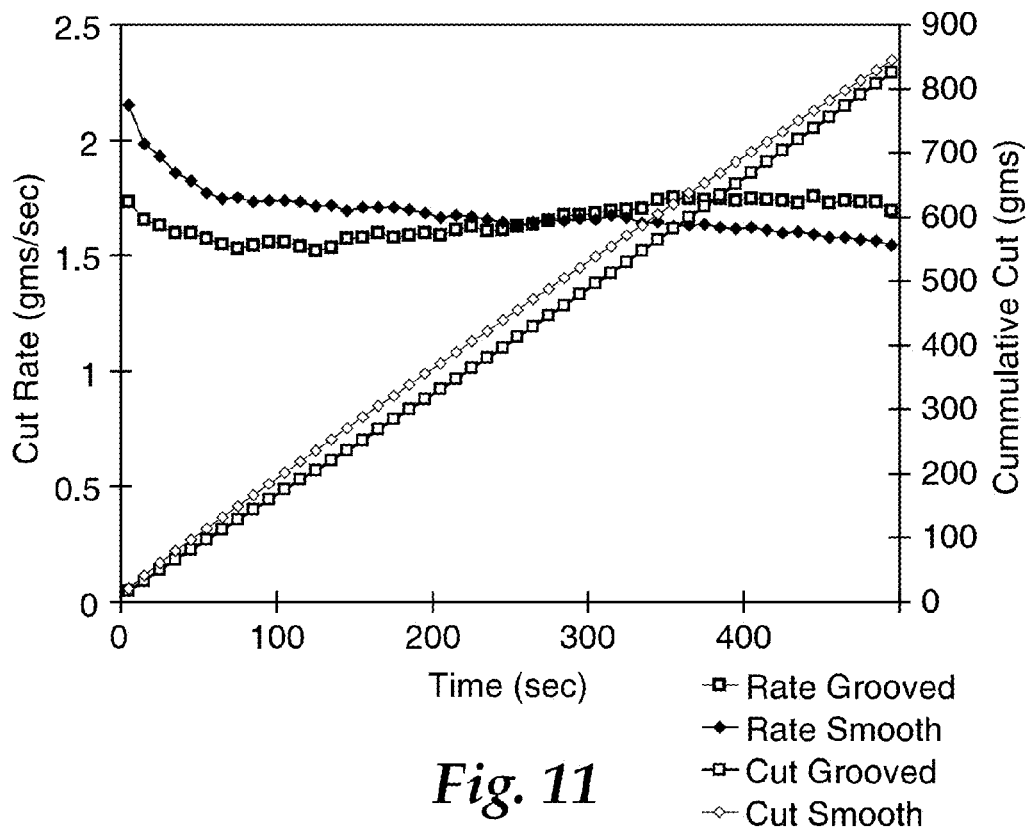
FIG. 11 illustrates a graph of Cut Rate and Cumulative Cut for shaped abrasive particles with and without grooves.

Referring to FIG. 11, the Cut Rate versus Time and the Total Cut Rate for the shaped abrasive particles with a 98 degree draft angle with and without grooves is illustrated. As seen, the initial cut rate for the shaped abrasive particles without grooves is greater than for the same size shaped abrasive particles with grooves. The cut rate for the shaped abrasive particles without grooves tends to decrease as the test progresses while the cut rate for shaped abrasive particles with grooves tends to increase as the test progresses.

Figure 12:
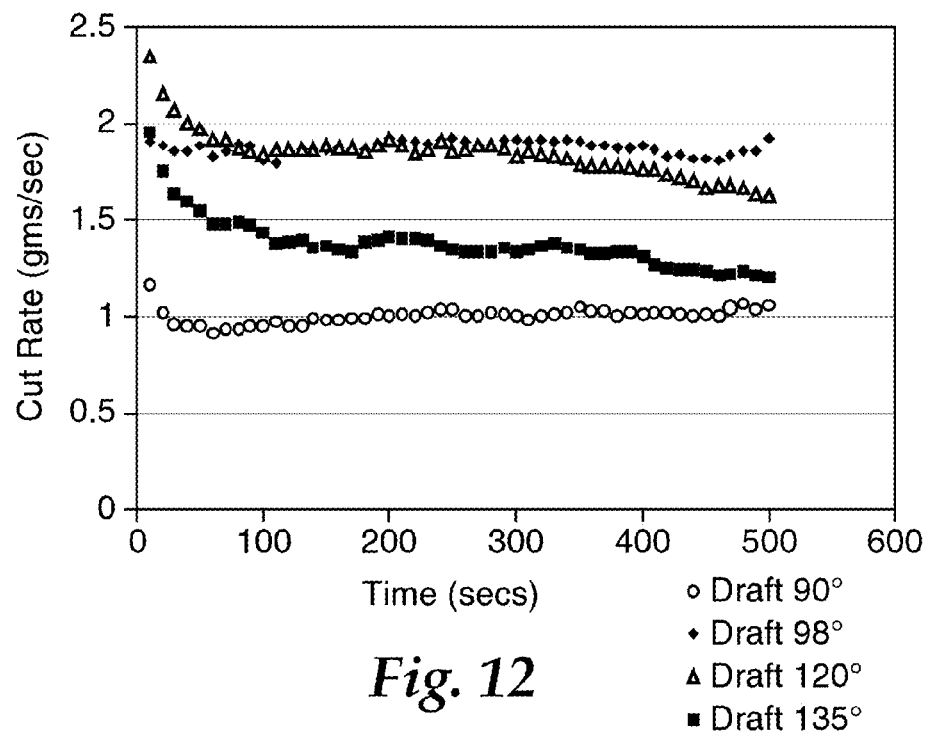
FIG. 12 illustrates a graph of Cut Rate versus Time for shaped abrasive particles with different draft angles.
Figure 13:
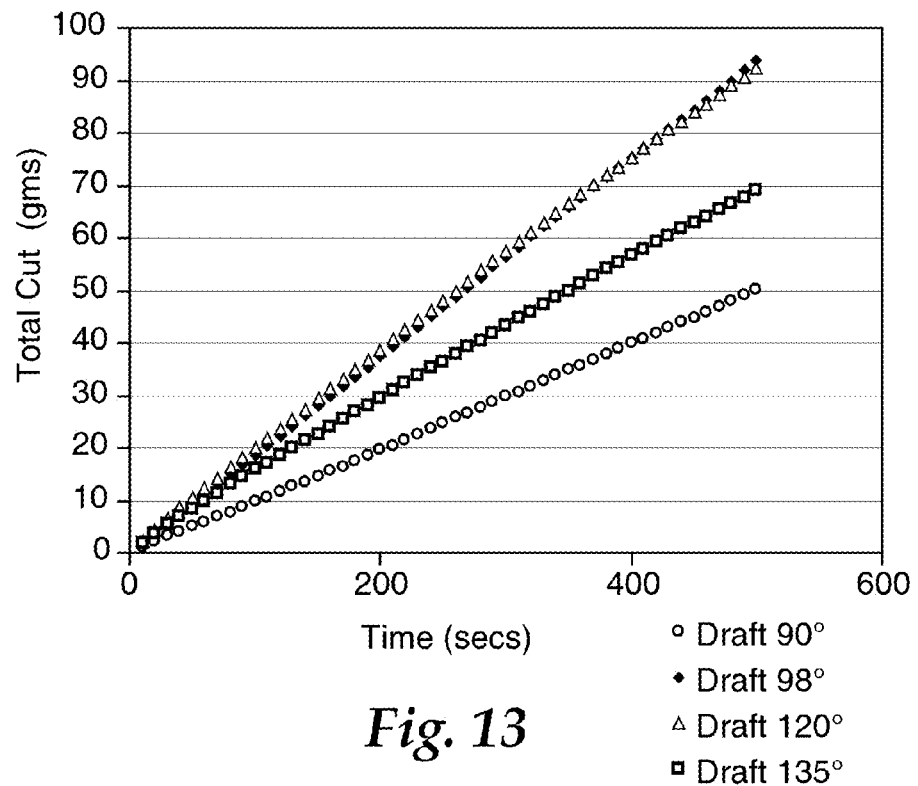
FIG. 13 illustrates a graph of Total Cut versus Time for shaped abrasive particles with different draft angles.

Referring to FIGS. 12 and 13, the Cut Rate versus Time and the Total Cut versus Time are plotted. As seen, shaped abrasive particles having a sloping sidewall with a draft angle greater than 90 degrees significantly out performed similarly shaped abrasive particles having a 90 degree draft angle. As the draft angle approached 135 degrees, the performance of the shaped abrasive particles with a sloping sidewall begin to rapidly deteriorate. When particles having a 135 degree draft angle are compared to the particles having a draft angle of 98 degrees, the initial cut rate was about the same but the total cut was significantly reduced. The particles having a draft angle of 120 degrees had approximately a 20% improvement in initial cut and approximately the same total cut as particles having a 98 degree draft angle, which was unexpected. Even more surprising, particles having only an 8 degrees change in draft angle from 90 degrees to 98 degrees had a huge jump in performance. The cut rate was approximately doubled and the cut rate remained relatively constant during the entire test duration since the abrasive article was a blend of 50% shaped abrasive particles with grooves and 50% shaped abrasive particles without grooves.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A production tooling for making shaped abrasive particles comprising a plurality of mold cavities, the plurality of mold cavities comprising a mold bottom surface, a mold sidewall, and a height, Hc;
    the entire tooling being made of a polymer;
    wherein the mold bottom surface comprises a plurality of ridges, and
    comprising a draft angle a between the mold bottom surface and the mold sidewall and the draft angle α is between 95 degrees to about 130 degrees.

2. The production tooling of claim 1 wherein the plurality of ridges comprise parallel lines.

3. The production tooling of claim 1 wherein the plurality of ridges extend completely across the mold bottom surface and intersect with the mold sidewall at a 90 degree angle.

4. The production tooling of claims 1, 2, or 3 wherein the cross sectional geometry of the plurality of ridges comprises a triangle or a truncated triangle.

5. The production tooling of claims 1, 2, or 3 wherein the plurality of ridges comprises a percent spacing and the percent spacing is between about 1% to about 50%.

6. The production tooling of claims 1, 2, or 3 wherein each of the plurality of ridges comprises a height, Hr, and the plurality of mold cavities comprises a height, Hc, and a percentage ratio of Hr/Hc is between about 0.1% to about 30%.

7. The production tooling of claims 1, 2, or 3 wherein a perimeter of the mold bottom surface comprises an equilateral triangle.

8. The production tooling of claim 1 wherein the plurality of ridges comprises a cross hatch pattern of intersecting lines.

9. The production tooling of claim 1 wherein the polymer is a thermoplastic.

\* \* \* \* \*

UNITED STATES PATENT AND TRADEMARK OFFICE
CERTIFICATE OF CORRECTION

PATENT NO. : 9,938,439 B2
APPLICATION NO. : 14/270741
DATED : April 10, 2018
INVENTOR(S) : John Boden Page 1 of 1

It is certified that error appears in the above-identified patent and that said Letters Patent is hereby corrected as shown below:

In the Specification

Column 2, Line 57, after "grooves" insert -- . --.

Column 11, Line 54, delete "13" and insert -- β --, therefor.

Column 20, Line 33, delete "sterate," and insert -- stearate, --, therefor.

In the Claims

Column 24, Line 65, in Claim 4, delete "claims" and insert -- claim --, therefor.

Signed and Sealed this
Eighteenth Day of December, 2018

Andrei Iancu
*Director of the United States Patent and Trademark Office*